(12) United States Patent
Shintani et al.

(10) Patent No.: US 10,495,735 B2
(45) Date of Patent: Dec. 3, 2019

(54) USING MICRO MIRRORS TO IMPROVE THE FIELD OF VIEW OF A 3D DEPTH MAP

(71) Applicants: Sony Corporation, Tokyo (JP); Sony Interactive Entertainment Inc., Tokyo (JP)

(72) Inventors: Peter Shintani, San Diego, CA (US); Jose Omar Gonzalez Hernandez, Chula Vista, CA (US); William Clay, San Diego, CA (US); Pablo Antonio Espinosa, San Diego, CA (US); Fred Ansfield, San Diego, CA (US); Bibhudendu Mohapatra, San Diego, CA (US); Keith Resch, San Diego, CA (US); Morio Usami, Tokyo (JP)

(73) Assignees: SONY CORPORATION, Tokyo (JP); Sony Interactive Entertainment Inc., Tokyo (JP)

( * ) Notice: Subject to any disclaimer, the term of this patent is extended or adjusted under 35 U.S.C. 154(b) by 167 days.

(21) Appl. No.: 15/432,674

(22) Filed: Feb. 14, 2017

(65) Prior Publication Data

US 2018/0231641 A1    Aug. 16, 2018

(51) Int. Cl.

| G01S 7/48 | (2006.01) |
|---|---|
| G01S 7/481 | (2006.01) |
| G01S 17/89 | (2006.01) |
| G02B 26/08 | (2006.01) |
| G01S 17/08 | (2006.01) |
| G01S 17/10 | (2006.01) |

(52) U.S. Cl.
CPC .......... *G01S 7/4817* (2013.01); *G01S 7/4816* (2013.01); *G01S 17/08* (2013.01); *G01S 17/89* (2013.01); *G02B 26/0833* (2013.01); *G01S 17/10* (2013.01)

(58) Field of Classification Search
CPC .......... G01S 17/93; G01S 17/89; G01S 17/42; G01S 7/487; G01S 7/481
See application file for complete search history.

(56) References Cited

U.S. PATENT DOCUMENTS

| 5,228,069 | A | * | 7/1993 | Arenson | .............. | A61B 6/4085 |
|---|---|---|---|---|---|---|
| | | | | | | 378/11 |
| 6,291,816 | B1 | | 9/2001 | Liu | | |
| 6,420,698 | B1 | | 7/2002 | Dimsdale | | |

(Continued)

FOREIGN PATENT DOCUMENTS

| EP | 2225699 A1 | 9/2010 |
|---|---|---|
| EP | 2730939 A2 | 5/2014 |
| EP | 2339532 B1 | 4/2015 |

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Non-Final Office Action dated Jul. 12, 2018. (201605639.01-1168-875).

(Continued)

*Primary Examiner* — Luke D Ratcliffe
(74) *Attorney, Agent, or Firm* — John L. Rogitz

(57) ABSTRACT

A micro mirror assembly widens the field of view (FOV) of a 3D depth map sensor, alleviating the limitation of limited laser illumination power and limitations on the resolution of the available imaging device.

20 Claims, 6 Drawing Sheets

(56) References Cited

U.S. PATENT DOCUMENTS

| | | |
|---|---|---|
| 6,442,465 B2 | 8/2002 | Breed et al. |
| 6,664,501 B1 | 12/2003 | Troitski |
| 6,970,183 B1 | 11/2005 | Monroe |
| 7,184,088 B1 | 2/2007 | Ball |
| 7,262,854 B2 | 8/2007 | Imura |
| 7,752,483 B1 | 7/2010 | Muresan et al. |
| 7,791,009 B2 | 9/2010 | Johnston et al. |
| 8,730,309 B2 | 5/2014 | Wilson et al. |
| 8,780,113 B1 | 7/2014 | Ciurea et al. |
| 8,803,950 B2 | 8/2014 | Ren et al. |
| 8,824,827 B2 | 9/2014 | Quan et al. |
| 8,830,555 B2 | 9/2014 | Aksamit et al. |
| 9,031,356 B2 | 5/2015 | Kunkel et al. |
| 9,098,908 B2 | 8/2015 | Kirk et al. |
| 9,214,492 B2 | 12/2015 | Tempel et al. |
| 9,235,928 B2 | 1/2016 | Medioni et al. |
| 9,262,691 B2 | 2/2016 | Kang et al. |
| 9,275,302 B1 | 3/2016 | Yan et al. |
| 9,286,694 B2 | 3/2016 | Kim et al. |
| 9,319,139 B2 | 4/2016 | Effenberger et al. |
| 9,405,008 B2 | 8/2016 | Raskar et al. |
| 9,426,450 B1 | 8/2016 | Zhang et al. |
| 9,435,891 B2 | 9/2016 | Oggier |
| 9,483,835 B2 | 11/2016 | Liang et al. |
| 9,542,749 B2 | 1/2017 | Freedman et al. |
| 9,557,166 B2 | 1/2017 | Thuries et al. |
| 9,618,613 B2 | 4/2017 | Murakami et al. |
| 9,760,837 B1 | 9/2017 | Nowozin et al. |
| 9,806,813 B2 | 10/2017 | Liu et al. |
| 9,858,673 B2 | 1/2018 | Ciurea et al. |
| 9,860,619 B2 | 1/2018 | Liu et al. |
| 9,995,578 B2 | 6/2018 | Ge et al. |
| 10,142,612 B2 | 11/2018 | Ge et al. |
| 2004/0141170 A1 | 7/2004 | Jamieson et al. |
| 2004/0141753 A1 | 7/2004 | Euw et al. |
| 2004/0208272 A1 | 10/2004 | Moursund et al. |
| 2005/0031166 A1 | 2/2005 | Fujimura et al. |
| 2005/0207755 A1 | 9/2005 | Rabbat et al. |
| 2005/0226214 A1 | 10/2005 | Keslassy et al. |
| 2006/0221241 A1 | 10/2006 | Okumichi et al. |
| 2006/0239558 A1 | 10/2006 | Rafii et al. |
| 2007/0024614 A1 | 2/2007 | Tam et al. |
| 2007/0279415 A1 | 12/2007 | Sullivan et al. |
| 2008/0152247 A1 | 6/2008 | Oh et al. |
| 2009/0080885 A1 | 3/2009 | Mehrotra et al. |
| 2009/0190853 A1 | 7/2009 | Noh |
| 2010/0302365 A1 | 12/2010 | Finocchio et al. |
| 2011/0025843 A1 | 2/2011 | Oggier et al. |
| 2011/0188773 A1 | 8/2011 | Wei et al. |
| 2011/0243570 A1 | 10/2011 | Kim et al. |
| 2012/0032833 A1 | 2/2012 | Milligan et al. |
| 2012/0044476 A1* | 2/2012 | Earhart ............. G01S 3/7867 356/4.01 |
| 2012/0056982 A1 | 3/2012 | Katz et al. |
| 2012/0069009 A1 | 3/2012 | Shimoyama et al. |
| 2012/0168605 A1* | 7/2012 | Milanovic ............ G01B 11/002 250/203.1 |
| 2012/0182394 A1 | 7/2012 | Bae et al. |
| 2012/0248514 A1 | 10/2012 | Korekado et al. |
| 2012/0293615 A1 | 11/2012 | Chen et al. |
| 2012/0306876 A1 | 12/2012 | Shotton et al. |
| 2013/0051516 A1 | 2/2013 | Yang et al. |
| 2013/0129224 A1 | 5/2013 | Katz et al. |
| 2013/0195083 A1 | 8/2013 | Kim et al. |
| 2013/0207970 A1 | 8/2013 | Shpunt et al. |
| 2013/0278604 A1 | 10/2013 | Georgis et al. |
| 2013/0293684 A1 | 11/2013 | Becker et al. |
| 2013/0329012 A1 | 12/2013 | Bartos et al. |
| 2014/0058367 A1 | 2/2014 | Dantus |
| 2014/0079288 A1 | 3/2014 | Lee et al. |
| 2014/0092221 A1 | 4/2014 | Nagai |
| 2014/0168424 A1 | 6/2014 | Attar et al. |
| 2014/0198977 A1 | 7/2014 | Narasimha et al. |
| 2014/0226984 A1 | 8/2014 | Roberts et al. |
| 2014/0240467 A1 | 8/2014 | Petyushko et al. |
| 2014/0253679 A1 | 9/2014 | Guigues et al. |
| 2014/0253691 A1 | 9/2014 | Holz |
| 2014/0293993 A1 | 10/2014 | Ryhorchuk |
| 2014/0333728 A1 | 11/2014 | Navab et al. |
| 2014/0355901 A1 | 12/2014 | Tezaur |
| 2014/0375851 A1 | 12/2014 | Lee et al. |
| 2014/0376768 A1 | 12/2014 | Troy et al. |
| 2015/0002636 A1 | 1/2015 | Brown |
| 2015/0022643 A1 | 1/2015 | Stetson et al. |
| 2015/0024336 A1 | 1/2015 | Blassnig et al. |
| 2015/0036926 A1 | 2/2015 | Choi et al. |
| 2015/0070489 A1 | 3/2015 | Hudman et al. |
| 2015/0130903 A1 | 5/2015 | Thompson et al. |
| 2015/0130904 A1 | 5/2015 | Bae et al. |
| 2015/0171968 A1 | 6/2015 | Featherston et al. |
| 2015/0248765 A1 | 9/2015 | Criminisi et al. |
| 2015/0254811 A1 | 9/2015 | Sahu et al. |
| 2015/0294686 A1 | 10/2015 | Autioniemi |
| 2015/0309663 A1 | 10/2015 | Seo et al. |
| 2015/0339471 A1* | 11/2015 | Bennett ............... G06F 21/32 726/19 |
| 2015/0371393 A1 | 12/2015 | Ramachandra et al. |
| 2015/0373322 A1 | 12/2015 | Goma et al. |
| 2015/0378023 A1 | 12/2015 | Royo et al. |
| 2016/0012633 A1 | 1/2016 | Wei et al. |
| 2016/0097851 A1 | 4/2016 | Zhang et al. |
| 2016/0098847 A1 | 4/2016 | Crnokrak |
| 2016/0099777 A1 | 4/2016 | Liu et al. |
| 2016/0124089 A1 | 5/2016 | Meinherz et al. |
| 2016/0173869 A1 | 6/2016 | Wang et al. |
| 2016/0191759 A1 | 6/2016 | Somanath et al. |
| 2016/0239725 A1 | 8/2016 | Liu et al. |
| 2016/0291160 A1 | 10/2016 | Zweigle et al. |
| 2016/0328828 A1 | 11/2016 | Zhang et al. |
| 2016/0344967 A1 | 11/2016 | Barnes et al. |
| 2017/0061701 A1 | 3/2017 | Mittal et al. |
| 2017/0188017 A1 | 6/2017 | Hall |
| 2017/0201738 A1 | 7/2017 | Lacaze et al. |
| 2017/0264880 A1 | 9/2017 | Zolotov |
| 2017/0277180 A1 | 9/2017 | Baer et al. |
| 2017/0332750 A1 | 11/2017 | Gharabegian |
| 2017/0372527 A1 | 12/2017 | Murali et al. |
| 2017/0374342 A1 | 12/2017 | Zhao |
| 2018/0033357 A1* | 2/2018 | Li ........................ H04N 9/31 |
| 2018/0034579 A1 | 2/2018 | Liu et al. |
| 2018/0053284 A1 | 2/2018 | Rodriguez et al. |
| 2018/0100928 A1* | 4/2018 | Keilaf ................. G01S 17/936 |
| 2018/0124371 A1 | 5/2018 | Kamal et al. |
| 2018/0173990 A1 | 6/2018 | Shintani et al. |
| 2018/0176483 A1 | 6/2018 | Knorr et al. |
| 2018/0190014 A1 | 7/2018 | Yarborough et al. |
| 2018/0234617 A1 | 8/2018 | Przyborski |

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Applicant's response to Non-Final Office Action filed Jul. 16, 2018. (201605639.01-1168-875).

Riegler et al., "A Deep Primal-Dual Network for Guided Depth Super-Resolution", Institute for Computer Graphics and Vision, Graz University of TechnologyAustria, Jul. 28, 2016.

Schuon et al., "High-Quality Scanning Using Time-of-Flight Depth Superresolution", Stanford University, 2008.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", file history of related U.S. Appl. No. 15/477,369, filed Apr. 3, 2017. (201605644.01-1168-880).

Michael Taylor, Glenn Black, Javier Fernandez Rico, "Multipoint Slam Capture", file history of related U.S. Appl. No. 16/019,140, filed Jun. 26, 2018. (SCEA18005US00-1273-019).

Peter Shintani, Jose Omar Gonzalez Hernandez, William Clay, Pablo Antonio Espinosa, Fred Ansfield, Bibhudendu Mohapatra,

(56) References Cited

OTHER PUBLICATIONS

Keith Resch, Morio Usami, "Using Pattern Recognition to Reduce Noise in a 3D Map", related U.S. Appl. No. 15/383,392, Non-Final Office Action dated Apr. 19, 2018. (201605638.01-1168-871).

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Non-Final Office Action filed Apr. 25, 2018. (201605638.01-1168-871).

Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.

Peter Shintani, Morio Usami, Kazuyuki Shikama, Keith Resch, "Generating 3D Depth Map Using Parallax", file history of related U.S. Appl. No. 15/798,914, filed Oct. 31, 2017. (201705777.01-1168-916).

Peter Shintani, Morio Usami, Kissei Matsumoto, Kazuyuki Shikama, Bibhudendu Mohapatra, Keith Resch, "3D Depth Map", related U.S. Appl. No. 15/590,497, Final Office Action dated Nov. 19, 2018. (201605686.02-1168-881).

Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Final Office Action filed Dec. 6, 2018. (201605686.02-1168-881).

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Dec. 27, 2018. (201605644.01-1168-880).

Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.

Peter Shintani, Morio Usami, Kissei Matsumoto, Kazuyuki Shikama, Bibhudendu Mohapatra, Keith Resch, "3D Depth Map", file history of related U.S. Appl. No. 15/590,497, filed May 9, 2017. (201605686.02-1168-881).

Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.

Quang H. Nguyen, Minh N. Do, Sanjay J. Patel, "Depth image-based rendering from multiple cameras with 3D propagation algorithm", May 27, 2009.

Shuran Song, Jianxiong Xiao, "Sliding Shapes for 3D Object Detection in Depth Images", Abstract, Sep. 2014.

Yo-Sung Ho, Yun-Suk Kang, "Multi-View Depth Generation using Multi-Depth Camera System", Gwangju Institute of Science and Technology, Jan. 4, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", file history of related U.S. Appl. No. 15/383,392, filed Dec. 19, 2016. (201605638.01-1168-871).

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", file history of related U.S. Appl. No. 15/370,197, filed Dec. 6, 2016. (201605635.01-1168-872).

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", file history of related U.S. Appl. No. 15/371,433, filed Dec. 7, 2016. (201605637.01-1168-874).

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", file history of related U.S. Appl. No. 15/383,683, filed Dec. 19, 2016. (201605639.01-1168-875).

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Apr. 5, 2018. (201605635.01-1168-872).

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 16, 2018. (201605635.01-1168-872).

Jinbeum Jang, Sangwoo Park, Jieun Jo, Joonki Paik, "Depth map generation using a single image sensor with phase masks", Image Processing and Intelligent System Laboratory Graduate School of Advanced Imaging Science and Film, Chung-Ang University, Seoul, South Korea, Optical Society of America, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jan. 4, 2019. (201605644.01-1168-880).

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Non-Final Office Action dated Jan. 10, 2019. (201605637.01-1168-874).

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Non-Final Office Action filed Jan. 17, 2019. (201605637.01-1168-874).

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Jun. 21, 2018. (201605644.01-1168-880).

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jun. 27, 2018. (201605644.01-1168-880).

Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Jun. 15, 2018. (201605686.02-1168-881).

Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Jun. 20, 2018. (201605686.02-1168-881).

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Final Office Action dated Sep. 10, 2018. (201605635.01-1168-872).

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Final Office Action filed Sep. 12, 2018. (201605635.01-1168-872).

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Final Office Action dated Sep. 12, 2018. (201605638.01-1168-871).

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Aug. 23, 2018. (201605644.01-1168-880).

(56) References Cited

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Sep. 4, 2018. (201605644.01-1168-880).

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Final Office Action filed Sep. 14, 2018. (201605638.01-1168-871).

Nathan Silberman, Rob Fergus, "Indoor Scene Segmentation using a Structured Light Sensor", Dept. of Computer Science, Nov. 6, 2011, Courant Institute, New York University, pp. 601-608.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Final Office Action dated Apr. 2, 2019. (201605637.01-1168-874).

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Final Office Action filed Apr. 15, 2019. (201605637.01-1168-874).

Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Mar. 25, 2019. (201605686.02-1168-881).

Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Apr. 2, 2019. (201605686.02-1168-881).

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Mar. 21, 2019. (201605635.01-1168-872).

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 1, 2019. (201605635.01-1168-872).

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Feb. 11, 2019. (201605644.01-1168-880).

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Feb. 21, 2019. (201605644.01-1168-880).

He et al, "Iterative Transduction Learning for Automatic Image Segmentation and Matting with RGB-D Data", Elsevier, Mar. 2014.

Jang et al, "Depth Map Generation Using a Single Image Sensor with Phase Masks", Chang-Ang University, Seoul, South Korea, Jun. 2016.

Kim et al, "Multi-focusing and Depth Estimation Using a Color Shift Model-Based Computational Camera", IEEE Transactions on Image Processing, vol. 21, No. 9, Sep. 2012.

Li et al, "Brain-Inspired Framework for Fusion of Multiple Depth Cues", IEEE Transactions on Circuits and Systems for Video Technology, vol. 23, No. 7, Jul. 2013.

Roy et al, "Denoising 3D Models with Attributes Using Soft Thresholding", Bourgogne University, France, 2004.

Shintani et al, "Color Noise Reduction in 3D Depth Map", related U.S. Appl. No. 15/371,433, Non-Final Office Action dated Jun. 21, 2019. (201605637.01-1168-874).

Shintani et al, "Color Noise Reduction in 3D Depth Map", related U.S. Appl. No. 15/371,433, Non-Final Office Action response filed Jun. 28, 2019. (201605637.01-1168-874).

Shintani et al, "Using Super Imposition to Render a 3D Depth Map", related U.S. Appl. No. 15/477,369, Applicant's Reply Brief filed May 29, 2019. (201605644.01-1168-880).

Shintani et al, "Using Super Imposition to Render a 3D Depth Map", related U.S. Appl. No. 15/477,369, Examiner's Answer dated May 13, 2019. (201605644.01-1168-880).

Shintani et al., "3D Depth Map", related U.S. Appl. No. 15/590,497, Applicant's response to Non-Final Office Action filed Aug. 7, 2019. (201605686.02-1168-881).

Shintani et al., "3D Depth Map", related U.S. Appl. No. 15/590,497, Non-Final Office Action dated Jul. 29, 2019. (201605686.02-1168-881).

Shintani et al., "Generating 3D Depth Map Using Parallax", related U.S. Appl. No. 15/798,914, Applicant's response to Non-Final Office Action filed Jul. 12, 2019. (201705777.01-1168-916).

Shintani et al., "Generating 3D Depth Map Using Parallax", related U.S. Appl. No. 15/798,914, Non-Final Office Action dated Jul. 9, 2019. (201705777.01-1168-916).

\* cited by examiner

Digital Light Processing Analog

USING MICRO MIRRORS TO IMPROVE THE FIELD OF VIEW OF A 3D DEPTH MAP

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders to locate and track each other.

SUMMARY

As understood herein, such devices may use lasers to provide three dimensional (3D) depth maps of objects in the field of view (FOV) of cameras of the devices. Depth maps are discussed in the present assignee's U.S. Pat. No. 8,472,746. 3D depth maps generated using lasers are discussed in U.S. Pat. No. 9,456,307. Both of these documents are incorporated by reference herein. Such 3D depth maps are generated typically using "time of flight" principles, i.e., by timing the periods from laser transmission to reception of each reflection, with regions of an object further away taking longer for the light to propagate to it and then return to a detector. The time of flight for each detected reflection by a sensor, typically a complementary metal oxide semiconductor (CMOS) camera, is converted to distance to generate the depth map.

As further understood herein, a problem with TOF 3D camera mapping systems is the illumination of the camera's field of view by a laser. As the distance increases (depth), the reflected laser power drops so the noise increases. This means that the accuracy of the depth map decreases and the measurement time increases (averaging). A brute force response to this problem would be to increase the illumination by increasing the laser power, but this method raises safety issues and power consumption issues. Thus, while the signal to noise ratio (SNR) in TOF 3D depth mapping is determined by the power of the illuminating laser but the system is constrained by power, a noisier 3D depth map results. Or, if averaging is employed, noise can be reduced but then the update rate of the 3D depth map must increase, again consuming power.

Accordingly, a device includes at least one computer medium that is not a transitory signal and that comprises instructions executable by at least one processor to activate a laser to emit light, and to move a micro mirror assembly to a first configuration to reflect the light onto a first area of an object distanced from the device and disposed on a surface on which the device is also disposed. The instructions are also executable to receive, from at least one detector, a signal representing a reflection of the light from the first area and to determine a distance to the first area based at least in part on a time of receipt of the signal representing the reflection of the light from the first area. Moreover, the instructions are executable to move the micro mirror assembly to a second configuration to reflect the light onto a second area, receive from the detector a signal representing a reflection of the light from the second area, and determine a distance to the second area based at least in part on a time of receipt of the signal representing the reflection of the light from the second area. A three dimensional (3D) depth map is then generated at least in part using the distances to the first and second areas.

The device may include the processor.

The micro mirror assembly may include a mechanism similar to laser bar code scanner to widen a field of view (FOV) of the detector. In such a case, the instructions may be executable to determine the distance to the first area at least in part by determining a time of flight (TOF) between a time of light transmission and a time of reflection reception.

The micro mirror assembly may include a mechanism similar to a Digital Light Processing (DLP) array to increase the resolution by synchronously shifting the FOV by ½ line height to increase the resolution. In this mechanism the mirror(s) essentially are vibrated by a piezoelectric transducer. In such a case, the detector has a field of view (FOV) and the instructions may be executable to move the micro mirror assembly to shift the FOV of the detector by one-half line height. Furthermore, the instructions may be executable to use a lateral shift of the detector to double a horizontal resolution of the detector.

In another aspect, a method includes illuminating an object on a surface using a laser on a first device on the surface and spaced from the object. The method includes moving a micro mirror assembly to deflect the light from a first area of the object to a second area of the object. The method further includes receiving reflections from the object of light deflected by the micro mirror assembly, and based at least in part of time of receipt of the reflections, generating an image of the object.

In another aspect, an assembly includes plural devices, each of which includes at least one laser range finder configured to output signals useful for generating images of other devices on a surface, at least one micro mirror assembly for reflecting light from the laser range finder onto an object to be mapped, and at least one light detector for receiving reflections of the light from the laser finder deflected by the micro mirror assembly and reflected by the object. At least one processor is configured with instructions for generating a 3D depth map of the object based on one or more aspects of the reflections of the light.

The details of the present application, both as to its structure and operation, can be best understood in reference to the accompanying drawings, in which like reference numerals refer to like parts, and in which:

DETAILED DESCRIPTION

Figure 1:
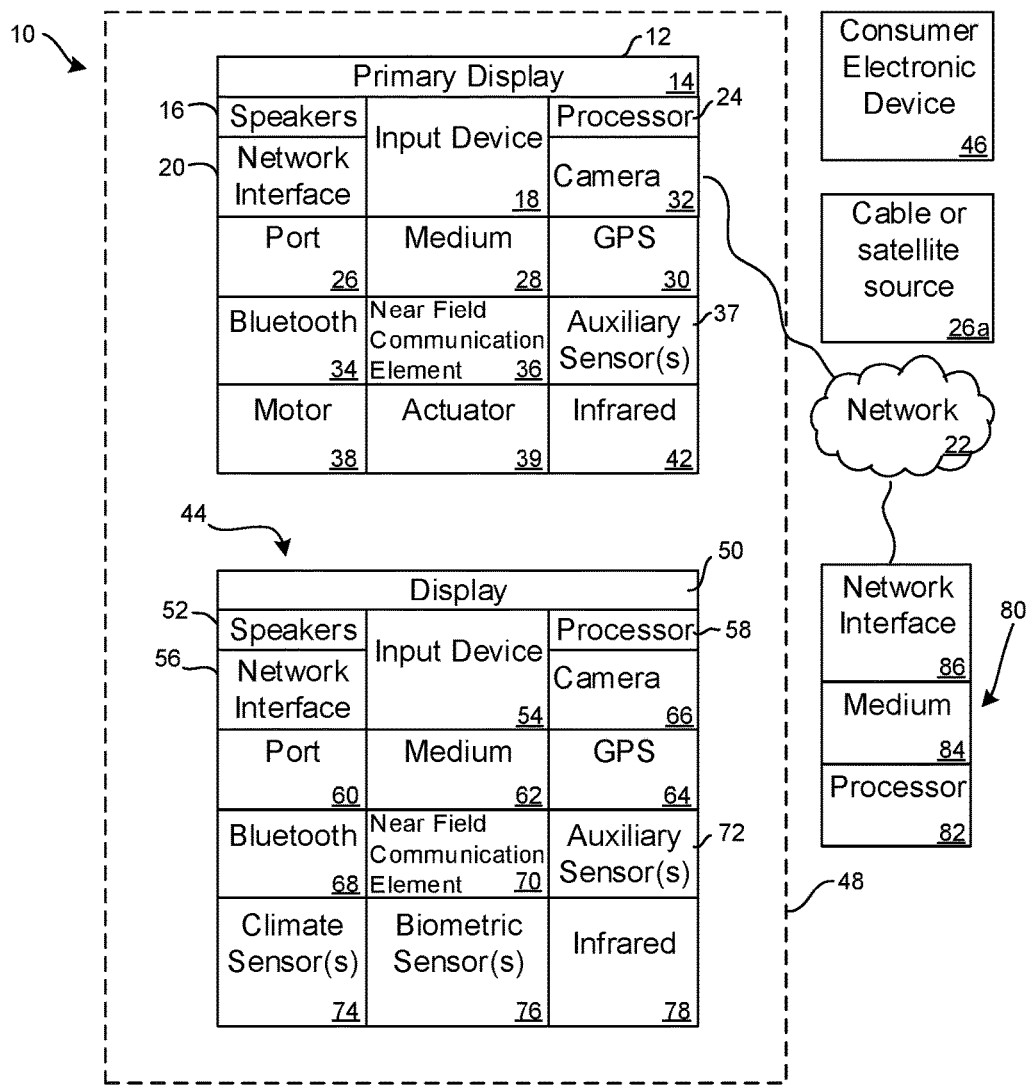
FIG. 1 is a block diagram of an example device.

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/ or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The computerized device 12 may further include one or more computer memories 28 such as disk-based or solid state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
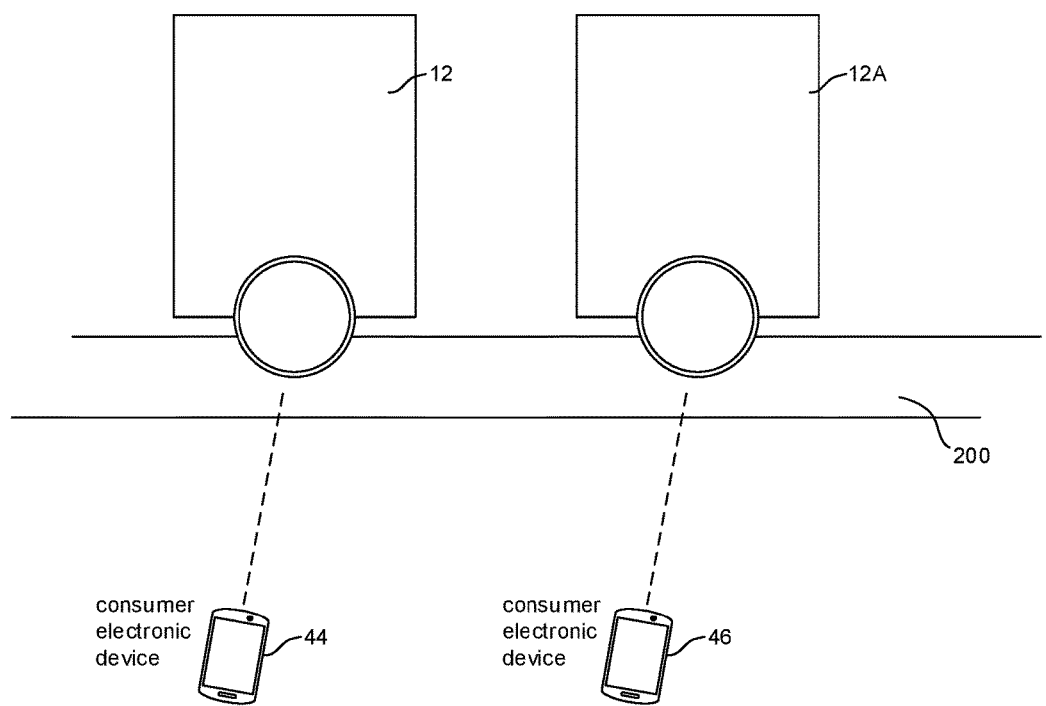
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
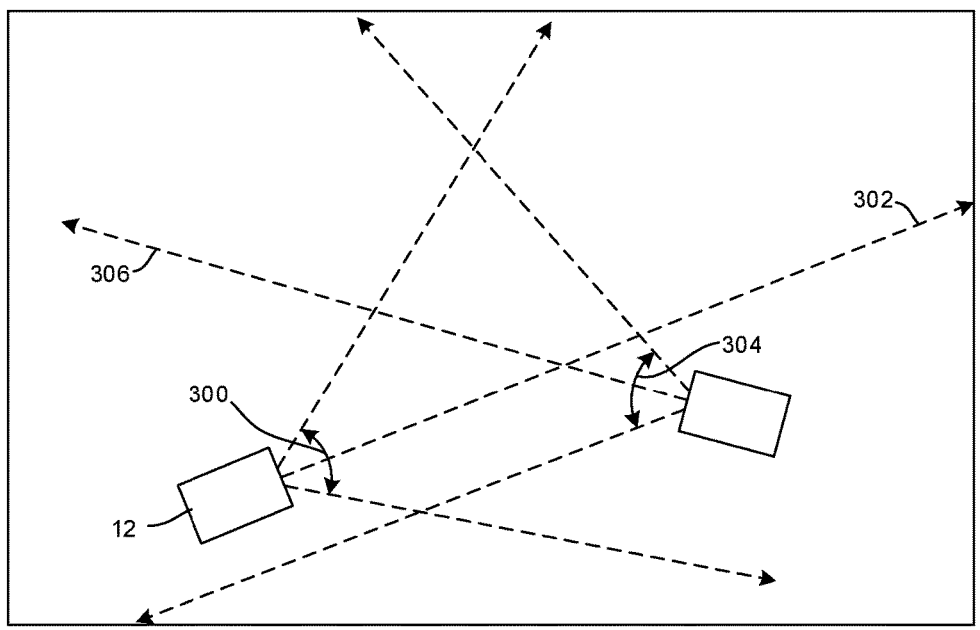
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown.

Figure 4:
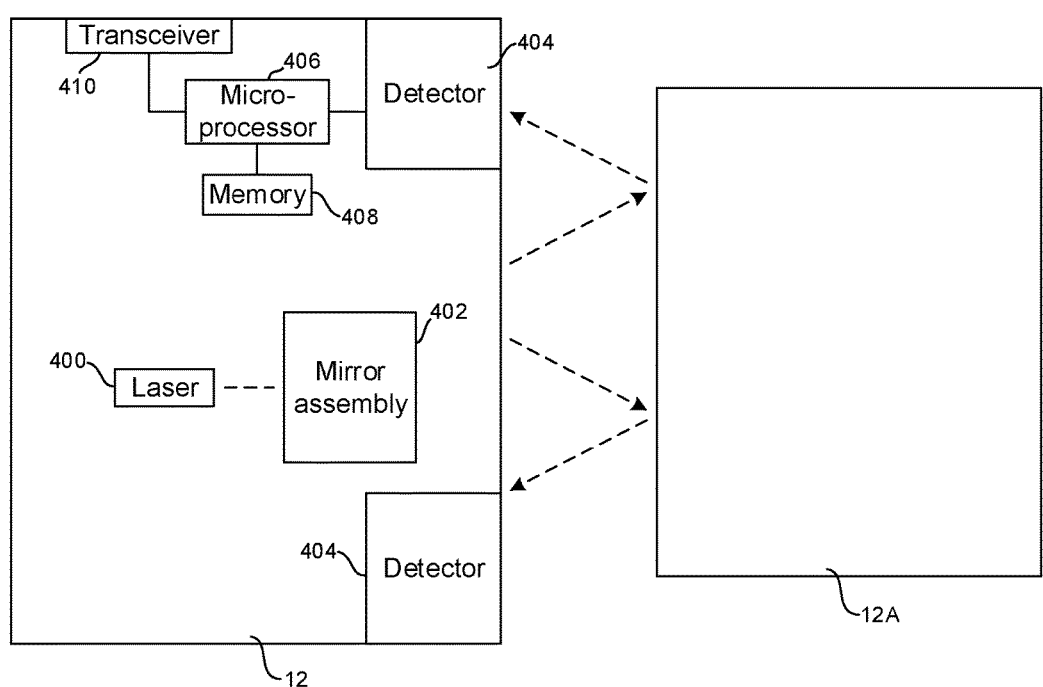
FIG. 4 is a more detailed schematic top view of the devices of FIG. 3.

FIG. 4 shows additional details of the CE device 12, it being understood that the CE device 12A may also have similar components. The CE device 12 includes a laser 400 emitting light onto an oscillating mirror assembly 402. The assembly 402 may include an array of micro-mirrors similar to what is used in a laser bar code scanner to widen the FOV of one or more detectors 404 such as cameras that receive reflections of the laser light from objects such as the second CE device 12A, alleviating the limitation of limited laser illumination power and limitations on the resolution of the available imaging device. By way of example and without limitation, any one or more of the components disclosed in U.S. Pat. Nos. 5,486,944, 6,817,529, 4,816,661, 4,409,470, 5,614,706, 5,923,025, and USPP 2012/0111946 may be used to implement the mirror assembly 402.

The detector(s) 404 sends signals to a processor 406 accessing instructions on a computer storage 408 and communicating information including depth map information to local or remote components using an appropriate transceiver 410. The processor 406, storage 408, and transceiver 410 may be implemented by any of the corresponding components described previously.

The micro mirrors in the assembly 402 are used to improve the FOV of the detectors 404 when necessary owing to power constraints. One or more mirrors in the assembly 402 equivalently can be used to aim the laser for illuminating only a portion of the FOV that is being measured in synchronization with the image detector's scanning, and/or to scan both the laser and image sensor's FOV together.

Figure 5:
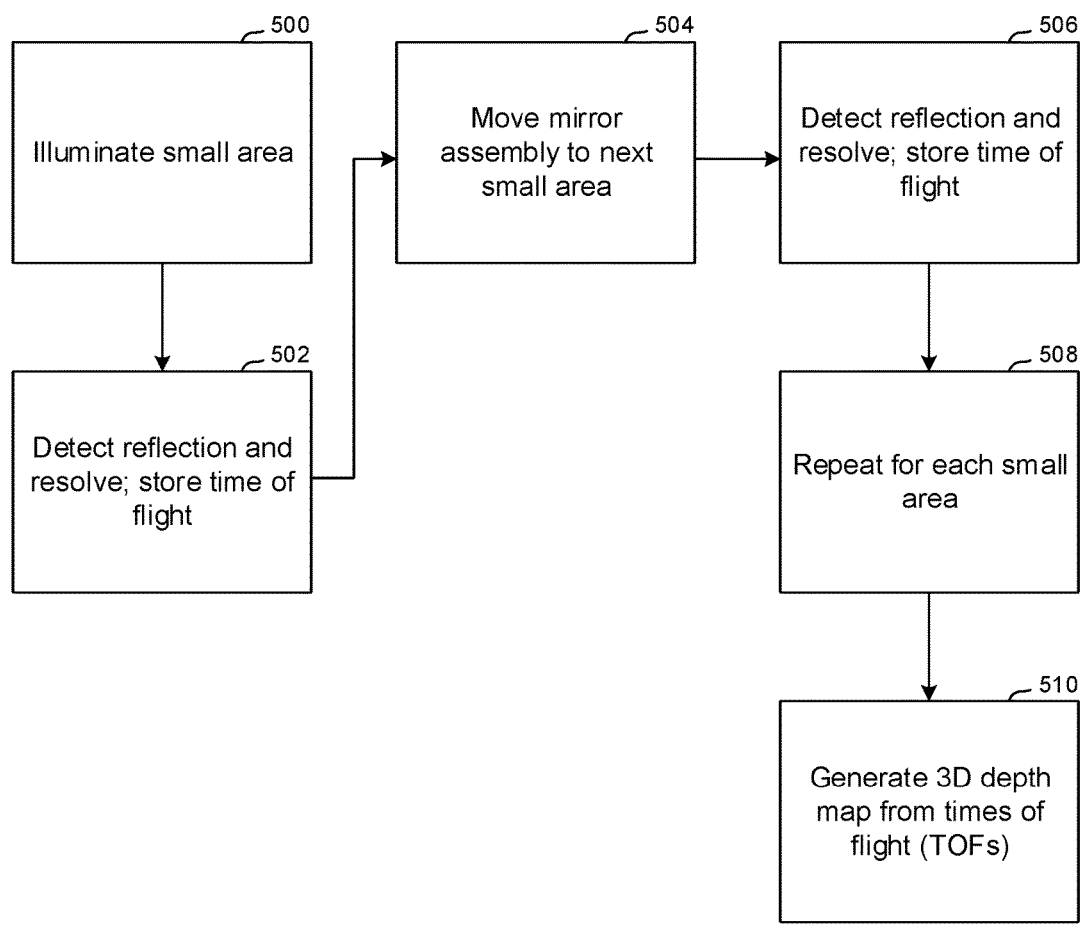
FIGS. 5 and 6 are flow charts of example non-limiting algorithms appertaining to the devices of previous figures.

The higher resolution of the detector 404 (such as a camera sensor), the smaller each pixel will be, and the lower the number of photons that are captured, resulting in a lower SNR. Accordingly, at block 500 of FIG. 5 the laser 400 may be used to illuminate a relatively small area of an object such as the device 12A to be mapped. A smaller area is illuminated and a smaller area is resolved at a given time at block 502, including storing TOF information of the reflected laser transmission (time between transmitting a laser pulse and receiving a return). At block 504 the mirror assembly is then moved to illuminate another small area and thereby widen the FOV when necessary. The reflection of this next pulse is detected at block 506 and resolved, again recording the TOF information. Block 508 simply indicates that the process of moving the mirror assembly to another area and generating further TOF information is repeated until the object has been illuminated over its surface, with a 3D depth map then being generated at block 510 using the TOF information. This alleviates the drawback of limited laser illumination power and concomitant reduced resolution of the available imaging device.

Figure 6:
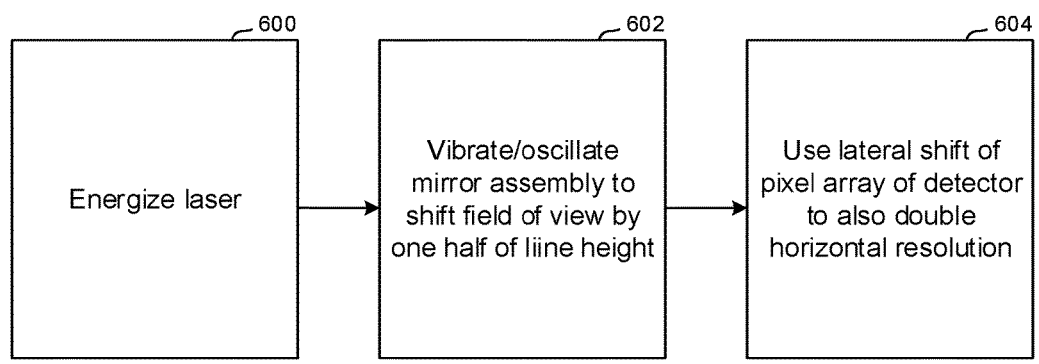

FIG. 6 shows an alternate method similar to that which may be used in a Digital Light Processing (DLP) array. DLP is a technology used in projectors and video projectors. In DLP applications such as image transmission systems and projectors, a DLP image is created by microscopically small mirrors that are positioned and arranged in a matrix on a semiconductor chip, which may be used to implement the mirror assembly 402 shown in FIG. 4. The "chip" is often referred to as a Digital Micromirror Device (DMD). Each micro mirror on the chip typically represents one pixel in the projected image. U.S. Pat. No. 8,830,555, incorporated herein by reference, provides additional details on DLP technology.

Commencing at block 600, the laser 400 is energized and at block 602 the mirror assembly as implemented by a DLP-like array is vibrating/oscillated to shifts the FOV of the detector(s) 404 by one-half line height, effectively doubling the vertical resolution. If desired, when the detector 404 has a laterally shifted pixel array, the lateral shift is used to also double the horizontal resolution in a like manner by moving the mirror assembly to shift the FOV of the detector by one-half line width.

While particular techniques and machines are herein shown and described in detail, it is to be understood that the subject matter which is encompassed by the present invention is limited only by the claims.

What is claimed is:

1. A device comprising:
   at least one computer medium that is not a transitory signal and that comprises instructions executable by at least one processor to:
   activate a laser on a first mobile apparatus to emit light;
   move a micro mirror assembly to a first configuration to reflect the light onto a first area of an object distanced from the device and disposed on a surface on which the device is also disposed, the object comprising a second mobile apparatus and comprising a laser emitter configured to illuminate the first mobile apparatus to generate at least one image thereof;
   receive, from at least one detector, a signal representing a reflection of the light from the first area;
   determine a distance to the first area based at least in part on a time of receipt of the signal representing the reflection of the light from the first area;
   move the micro mirror assembly to a second configuration to reflect the light onto a second area of the object;
   receive from the detector a signal representing a reflection of the light from the second area;
   determine a distance to the second area based at least in part on a time of receipt of the signal representing the reflection of the light from the second area; and
   generate a three dimensional (3D) depth map of the object at least in part using the distances to the first and second areas.

2. The device of claim 1, comprising the at least one processor.

3. The device of claim 1, wherein the micro mirror assembly includes a laser bar code scanner-like mechanism to widen a field of view (FOV) of the detector.

4. The device of claim 1, wherein the instructions are executable to determine the distance to the first area at least in part by determining a time of flight (TOF) between a time of light transmission and a time of reflection reception.

5. The device of claim 1, wherein the micro mirror assembly includes a Digital Light Processing (DLP) array-like mechanism.

6. The device of claim 1, wherein the detector has a field of view (FOV) and the instructions are executable to move the micro mirror assembly to shift the FOV of the detector by one-half line height of the FOV of the detector.

7. The device of claim 6, wherein the instructions are executable to use a lateral shift of the detector to double a horizontal resolution of the detector.

8. A method comprising:
   illuminating an object on a surface using a laser on a first device on the surface and spaced from the object;
   moving a micro mirror assembly to deflect the light from a first area of the object to a second area of the object;
   receiving by at least a first detector reflections from the object of light deflected by the micro mirror assembly; based at least in part of time of receipt of the reflections, generating an image of the object; and
   vibrate/oscillate the micro mirror assembly to shift a field of view (FOV) of the first detector by one-half line height.

9. The method of claim 8, wherein the image includes a three dimensional (3D) depth map.

10. The method of claim 8, wherein the micro mirror assembly includes a laser bar code scanner-like mechanism.

11. The method of claim 8, comprising determining a time of flight (TOF) between a time of light transmission and a time of reflection reception.

12. The method of claim 8, wherein the micro mirror assembly includes a Digital Light Processing (DLP) array-like mechanism.

13. The method of claim 12, comprising moving the micro mirror assembly to shift a field of view (FOV) of a detector of the reflections by one-half line height of the FOV of the detector.

14. The method of claim 13, comprising using a lateral shift of the detector to double a horizontal resolution of the detector.

15. An assembly comprising:
    plural devices;
    each of the plural devices comprising at least one laser range finder configured to output signals useful for generating images of other of the plural devices on a surface, wherein at least a first one of the plural devices is within a field of view (FOV) of the laser range finder of at least a second one of the plural devices, and at least one micro mirror assembly for reflecting light from the laser range finder onto an object to be mapped, and at least one light detector for receiving reflections of the light from the laser finder deflected by micro mirror assembly and reflected by the object; and
    at least one processor configured with instructions for generating a 3D depth map of the object based on one or more aspects of the reflections of the light.

16. The assembly of claim 15, wherein the laser range finder comprises at least one laser and the instructions are executable to:
    activate the laser to emit light;
    move the micro mirror assembly to a first configuration to reflect the light onto a first area of the object;
    receive, from the detector, a signal representing a reflection of the light from the first area;
    determine a distance to the first area based at least in part on a time of receipt of the signal representing the reflection of the light from the first area;
    move the micro mirror assembly to a second configuration to reflect the light onto a second area;
    receive from the detector a signal representing a reflection of the light from the second area;
    determine a distance to the second area based at least in part on a time of receipt of the signal representing the reflection of the light from the second area; and
    generate the 3D depth map at least in part using the distances to the first and second areas.

17. The assembly of claim 16, wherein the micro mirror assembly includes a laser bar code scanner-like mechanism.

18. The assembly of claim 16, wherein the micro mirror assembly includes a Digital Light Processing (DLP) array-like mechanism.

19. The assembly of claim 16, wherein the detector has a field of view (FOV) and the instructions are executable to move the micro mirror assembly to shift the FOV of the detector by one-half line height of the FOV of the detector.

20. The assembly of claim 19, wherein the instructions are executable to use a lateral shift of the detector to double a horizontal resolution of the detector.

* * * * *